United States Patent
Siemensmeyer et al.

(10) Patent No.: US 6,597,426 B1
(45) Date of Patent: *Jul. 22, 2003

(54) FLAT ELEMENT WITH A CHOLESTERIC LIQUID CRYSTAL STRUCTURE

(75) Inventors: Karl Siemensmeyer, Frankenthal (DE); Peter Schuhmacher, Mannheim (DE); Markus Bröcher, Nethpen (DE); Christian Kuckertz, Olpe (DE); Werner Mormann, Siegen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/269,203
(22) PCT Filed: Sep. 15, 1997
(86) PCT No.: PCT/EP97/05031
  § 371 (c)(1),
  (2), (4) Date: Mar. 31, 1999
(87) PCT Pub. No.: WO98/14528
  PCT Pub. Date: Apr. 9, 1998

(30) Foreign Application Priority Data

Oct. 1, 1996 (DE) .......................... 196 40 619

(51) Int. Cl.⁷ ............... C09K 19/38; G02F 1/13
(52) U.S. Cl. ............... 349/185; 349/183; 349/175
(58) Field of Search ................ 349/175, 115, 349/176, 183, 186; 428/1.3, 1.31; 252/299.01, 299.7

(56) References Cited

U.S. PATENT DOCUMENTS 5,798,147 A * 8/1998 Beck et al. ............... 252/299.5
5,851,604 A * 12/1998 Muller-Rees et al. .......... 428/1

FOREIGN PATENT DOCUMENTS

| DE | 35 35 547 | 5/1986 |
| DE | 43 42 280 | 6/1995 |
| EP | 0 747 382 | 12/1996 |
| GB | 2 166 755 | 5/1986 |

OTHER PUBLICATIONS

Patents Abstracts of Japan, vol. 013, No. 515 (C–655), Nov. 17, 1989, JP 01 207328, Aug. 21, 1989.
G.W. Gray, et al., Liquid Crystals and Plastics Crystals, vol. 1, pps. 1–17, "Physico–Chemical Properties and Methods of Investigation," 1971.
H. Baessler, Festkörperprobleme XI, pps. 99–133, "LIQUID CRYSTALS." 1971.
H. Baessler, et al., Journal of Chemical Physics, The vol., 52, No.2, pps. 631–637, "Helical Twisting Power of Steriodal Solutes on Cholesteric Mesophases," Jan. 15, 1970.

H. Finkelmann, et al., pps. 799–800, "Helixinversion in Einem Binären Mischsystem Nematisch/Cholesterisch," 1973 (with partial English translation).

H. Stegemeyer, et al., vol. 58, No. 12, pps. 599–602, Induzierung Von Optishcer Aktivität Und Zirkulardichroismus In Nematischen Phasen Durch Chirale Molküle, 1971 (with partial English translation).

H. Finkelmann, et al., vol. 78, No. 9, pps. 869–874, "Beschreibung Cholseterischer Mischsysteme Mit Einer Erweiterten Goossens–Theorie," 1974.

G. Galli, Makromol. Chem., vol. 187, pps. 289–296, "Synthesis and termotropic Properties of New Mesogenic Diacrylate Monomers," 1986.

I. Heynderikx, et al., Mol. Cryst. Liq. Cryst., vol. 203, pps. 113–126, "The Use of Cholesterically–Ordered Polymer Networks in Practical Applications," 1991.

F.H. Kreuzer, et al., "LC–Pigments," 1993.

D.J. Broer, et al., Makromol. Chem, vol. 190, pps. 3201–3215, "In–Situ Photopolymerization of Oriented Liquid–Crystalline Acrylates, 4$^a$) Influence of a Lateral Methyl Substituent on Monomer and Oriented Polymer Network Properties of a Mesogenic Diacrylate," 1989.

R.A.M. Hikmet, Macromolecules, vol. 25, pps. 5759–5764, Piezoelectric Networks Obtained by Photopolymerization of Liquid Crystal Molecules, 1992.

H. Körner, pps. 456–457, "Curing of Liquid Crystalline Networks in Electric Fields: Preparation Oriented Thin Films," 1995.

G.G. Barclay, et al., Prog. Polym. Sci., vol. 18, pps. 889–945, "Liquid Crystalline and Rigid–Rod Networks," 1993.

* cited by examiner

Primary Examiner—James Dudek
Assistant Examiner—Tai Duong
(74) Attorney, Agent, or Firm—Oblon, Spivak, McClelland, Maier & Neustadt, P.C.

(57) ABSTRACT

Sheet-like structures obtainable by thermal curing and having a crosslinked cholesteric liquid crystalline ordered structure are suitable, for example, for decorative coatings, for producing security marks, pigmentary particles, polarizers, color filters and IR reflectors.

3 Claims, No Drawings

FLAT ELEMENT WITH A CHOLESTERIC LIQUID CRYSTAL STRUCTURE

BACKGROUND OF THE INVENTION

As is known for media with shape anisotropy, heating may result in liquid crystalline phases, called mesophases. The individual phases differ by the spatial arrangement of the molecular centers on the one hand, and by the molecular arrangement in respect of the long axes on the other hand (G. W. Gray, P. A. Winsor, Liquid Crystals and Plastic Crystals, Ellis Horwood Limited, Chichester 1974). The nematic liquid crystalline phase is distinguished by only one orientation long-range order existing through parallel arrangement of the long axes of the molecule. Provided that the molecules forming the nematic phase are chiral, the result is a cholesteric phase in which the long axes of the molecules form a helical superstructure perpendicular thereto (H. Baessler, Festkörperprobleme XI, 1971). The chiral moiety may either be present in the liquid crystalline molecule itself or be added as doping substance to the nematic phase, inducing the cholesteric phase. This phenomenon was first investigated on cholesterol derivatives (for example H. Baessler, M. M. Labes, J. Chem. Phys., 52, (1970) 631; H. Baessler, T. M. Laronge, M. M. Labes, J. Chem. Phys., 51, (1969) 799; H. Finkelmann, H. Stegemeyer, Z. Naturforschg. 28a, (1973) 799; H. Stegemeyer, K. J. Mainusch, Naturwiss., 58, (1971) 599, H. Finkelmann, H. Stegemeyer, Ber. Bunsenges. Phys. Chem. 78, (1974)) 869.

The cholesteric phase has remarkable optical properties: a high optical rotation and a pronounced circular dichroism which arises due to selective reflection of circularly polarized light within the cholesteric layer. The colors which are apparently different depending on the angle of view depend on the pitch of the helical superstructure, which in turn depends on the twisting ability of the chiral component. In this connection it is possible to alter the pitch, and thus the wavelength range of the selectively reflected light, of a cholesteric layer in particular by changing the concentration of a chiral doping substance. Cholesteric systems of this type provide interesting possibilities for practical application. Thus, it is possible by incorporating chiral moieties into mesogenic acrylic esters and orienting in the cholesteric phase, e.g. after photopolymerization, to prepare a stable, colored network, although the concentration of chiral component therein cannot then be changed (G. Galli, M. Laus, A. Angelon, Makromol. Chemie, 187, (1986) 289). It is possible by admixing noncrosslinkable chiral compounds with nematic acrylic esters and by photopolymerization to prepare a colored polymer which still contains large amounts of soluble components (I. Heyndricks, D. J. Broer, Mol. Cryst. Liq. Cryst. 203, (1991) 113). It is furthermore possible, by random hydrosilylation of mixtures of cholesterol derivatives and acrylate-containing mesogens with defined cyclic siloxanes and subsequent photopolymerization to obtain a cholesteric network in which the chiral component may comprise up to 50% of the material employed; however, these polymers still contain distinct amounts of soluble materials (F. H. Kreuzer, R. Maurer, Ch. Müller-Rees, J. Stohrer, Presentation No. 7, 22nd Meeting on Liquid Crystals, Freiburg, 1993).

DE-A 35 35 547 describes a process in which a mixture of cholesterol-containing monoacrylates can be converted by photopolymerization into cholesteric layers. However, the total amount of chiral component in the mixture is about 94%. Although the mechanical stability of such a material, as pure side-chain polymer, is not very great, the stability can be increased only by highly crosslinking diluents.

Besides the nematic and cholesteric networks described above, also known are smectic networks which are prepared in particular by photopolymerization of smectic liquid crystalline materials in the smectic liquid crystalline phase. The materials used for this are, as a rule, symmetrical liquid crystalline bisacrylates as described by, for example, D. J. Broer and R. A. M. Hikmet, Makromol. Chem. 190, (1989) 3201–3215. However, these materials have very high clearing points of >120° C. so that there is a risk of thermal polymerization. Piezoelectric properties can be obtained by admixing chiral materials when an $S_c$ phase is present (R. A. M. Hikmet, Macromolecules 25, 1992, 5759).

The publication by H. Körner and C. K. Ober in Polymer Materials, Science and Engineering, 73 (1995) 456–457 discloses, for example, liquid crystalline cyanates which are thermosetting. Furthermore, Progress in Polymer Science 18 (1993) 899–945, authors E. E. Barclay and C. K. Ober, likewise discloses corresonding liquid crystalline compounds which have epoxides as reactive groups.

Thermally crosslinkable cholesteric liquid crystalline systems have not hitherto been described.

BRIEF SUMMARY OF THE INVENTION

The present invention relates to sheet-like structures obtainable by thermal curing and having a crosslinked cholesteric liquid crystalline ordered structure.

DETAILED DESCRIPTION OF THE INVENTION

The sheet-like structures according to the invention have a superstructure like that of cholesteric liquid crystals. Either the superstructure is present even before the crosslinking, or it is formed during the crosslinking. It is produced a) from chiral nematic liquid crystalline compounds, b) from a nematic and a chiral liquid crystalline compound, c) from a nematic liquid crystalline and a chiral non-liquid crystalline compound or d) from a compound which is not nematic but undergoes a transition during the thermal curing into a nematic liquid crystalline structure, and a chiral compound.

Examples of suitable chiral compounds in this connection are the compounds described in German Patent Application P 19520660.6, with those disclosed in claim 5 being emphasized. These are compounds of the general structure $$(Z-Y^1-A-Y^2-M-Y^3)_n X \qquad \text{I}$$

in which the variables have the following meanings:

A spacer,

M mesogenic groups, $Y^1, Y^2, Y^3$ chemical bonds or the groups —O—; —S—; —CO—O—; —O—CO—; —O—CO—O—; —CO—N(R)— or —N(R)—CO—, R hydrogen or $C_1$–$C_4$—alkyl groups, X a radical of the formula

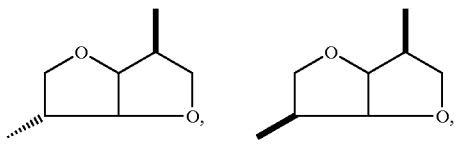

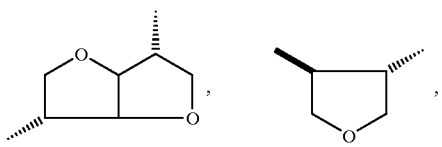

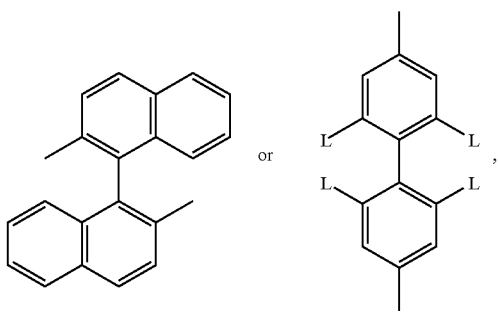

n 2 to 6 and

Z
a) in at least one case a radical having an isocyanate, isothiocyanate, cyanate, thiirane, aziridine, carboxyl, hydroxyl or amino group and
b) the other radicals are hydrogen or unreactive radicals, where the radicals L are, independently of one another, $C_1$–$C_4$—alkyl or —alkoxy, halogen, —CO—OR, —O—CO—R, —CO—NH—R or —NH—CO—R, and the radicals Z, $Y^1$, $Y^2$, $Y^3$, A and M, can, because they are present n times in I, be identical or different.

Examples of individual chiral compounds are:

I

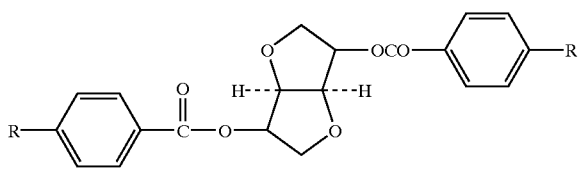

II

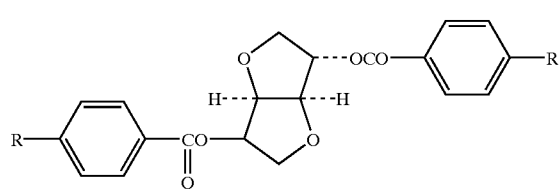

III

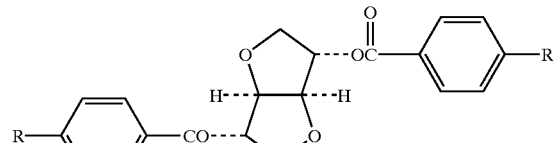

IV

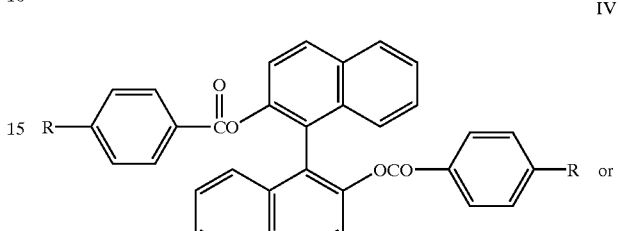

or

V

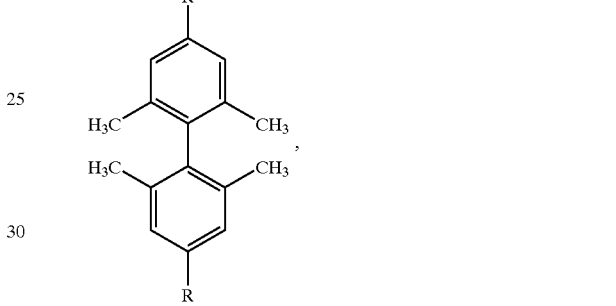

where R is OH, OCN, ONC or

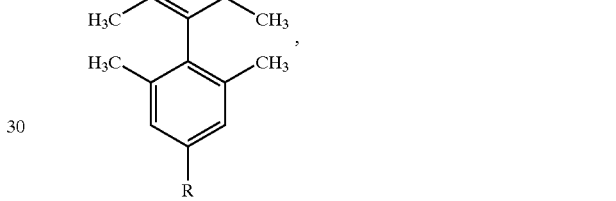.

The nematic compounds necessary according to a) to c) must be selected from the large number of known thermally crosslinkable structures, it being necessary to take account of the following aspects:

1. The nematic liquid crystalline compounds should have a sufficiently wide phase range.
2. Miscibility with chiral components mentioned in b) and c) must be ensured.
3. Good miscibility with other thermally crosslinkable liquid crystals is desirable to reduce the crystallization temperature and increase the clearing point.
4. The temperature at which the curing is carried out should be as low as possible, a favorable range being from 80 to 200° C., preferably 80 to 130° C.

The following compounds which substantially meet these criteria may be mentioned by way of example:

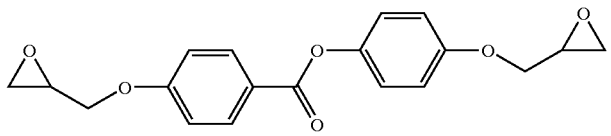

A

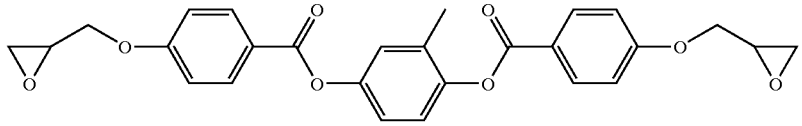

B

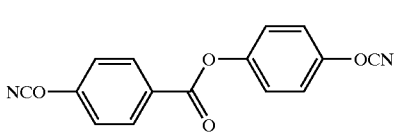

C

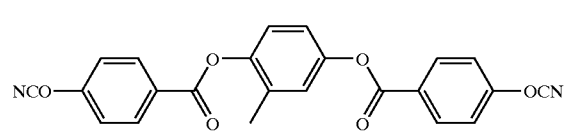

D

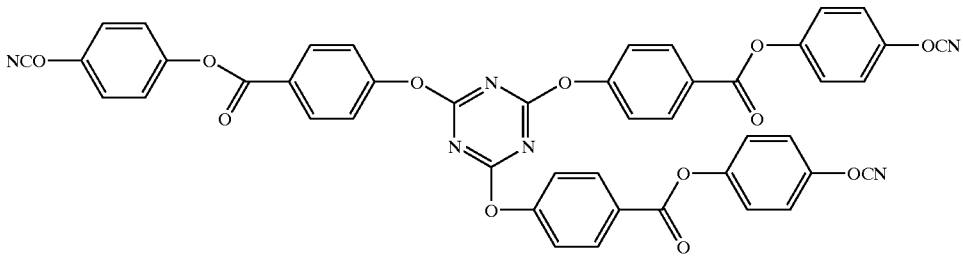

E

Combination of compounds A and B permits the melting points to be reduced by comparison with use of the individual components. The same applies to components C and D. Components A and B are cured, as is known, using amines which are added in stoichiometric amount. It is advantageous in this case to use structurally similar amines, preferably diamines, such as

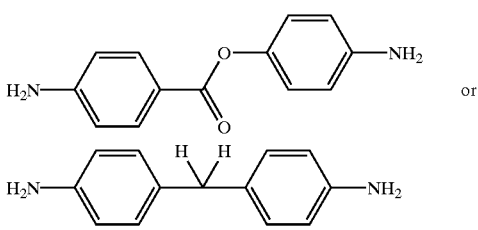

or

Since the amine component is, as a rule, not a liquid crystal, the overall system must be inherently balanced so that, on curing, a liquid crystalline system is produced or retained.

Details of the composition of such systems may be found in the examples in which, unless noted otherwise, parts and percentages are by weight.

Cyanates and isocyanates require, by contrast with epoxides, no additional components for the curing.

The sheet-like structures according to the invention are suitable, for example, for decorative coatings, for producing security marks, pigmentary particles, polarizers, color filters and IR reflectors.

The starting materials for the sheet-like structures according to the invention are expediently mixed while cooling, and preferably in dissolved form, until homogeneous and subsequently the solvent is removed. In order to preclude any premature polymerization, it may be appropriate to remove the solvent(s) by freeze-drying. The conditions for the mixing and drying depend on the system and must be selected appropriately.

Suitable solvents should be volatile and must have a good dissolving power for the components.

Examples which may be mentioned are ketones, lactones, esters, ethers, hydrocarbons or halohydrocarbons, such as acetone, methyl ethyl ketone, butyrolactone, methyl, ethyl or butyl acetate, diethyl ether, dioxane, tetrahydrofuran, methyl t-butyl ether, toluene, methylene chloride or chloroform.

The ratio of mixing of nematic component (potentially nematic component)/chiral component depends on the planned use of the sheet-like structures according to the invention. The color in particular is determined by the chiral content, because it is determined by the component itself and its helical twisting power. The examples contain corresponding information.

GENERAL METHOD FOR PREPARING THE MIXTURES

To prepare the mixtures, the individual components are dissolved in a solvent suitable for freeze-drying, in this case preferably dioxane. The monomer concentrations are from 0.005 to 0.01 mol/l. The parts by volume appropriate for the required composition are taken from these stock solutions, mixed, shock-frozen and then freeze-dried.

EXAMPLES a) Low-melting, Thermally Crosslinkable Liquid Crystalline Mixtures of Components A and B

TABLE 1

| Composition | | Melting point | Clearing point |
|---|---|---|---|
| [Mol % A] | [Mol % B] | [° C.] | [° C.] |
| 0 | 100 | 130 | 212 |
| 30 | 70 | 116 | 180 |
| 50 | 50 | 75 | 152 |
| 60 | 40 | 85 | 140 |
| 70 | 30 | 90 | 135 |
| 80 | 20 | 96 | 120 |
| 90 | 10 | 104 | 110 |
| 100 | 0 | 106 | 90 |

As is evident from the table, the melting point can be distinctly reduced by preparing mixtures. However, it is worthwhile to prepare the mixtures by dissolving. The conventional process for preparing mixtures, by fusing together, may lead to premature crosslinking and is thus unsuitable.

b) Effect of 4-aminophenyl 4-aminobenzoate (1)

Mixtures of A and B are used for the experiments, and 1 is added to result in equimolar ratios of the reactive groups. The mixtures are also prepared by dissolving. To determine the data, the mixtures are heated in a microscope at a heating rate of 10° C./min, and the microscopic appearance is observed. The melting points and glass transition temperatures are obtained from DSC (differential scanning calorimetry) investigations.

TABLE 2

| Composition | | | Melting point | Glass transition temperature | |
|---|---|---|---|---|---|
| [Wt. % A] | [Wt. % B] | [Wt. % 1] | [° C.] | [° C.] | Remarks |
| 74.9 | | 25.1 | 104 | 154 | isotropic curing |
| 66.4 | 9.9 | 23.7 | 44–87 | 155 | isotropic curing |
| 57.04 | 19.97 | 22.99 | 45–95 | 151 | isotropic curing |
| 48.53 | 29.11 | 22.36 | 42–90 | 149 | two-phase curing |
| 40.53 | 37.7 | 21.77 | 45–85 | 161 | two-phase curing |
| 33.1 | 45.6 | 21.3 | 44–90 | 165 | nematic curing |
| 18.4 | 61.4 | 20.2 | 42–88 | 162 | nematic curing |
| 6.0 | 74.8 | 19.2 | 75–100 | 157 | neumatic |
| | 80.7 | 19.3 | 80–90 | 154 | nematic curing | c) Effect of 4,4'-diaminodiphenylmethane (2)

Mixtures of A and B are used for the experiments, and 2 is added to result in equimolar ratios of the reactive groups. The mixtures are also prepared by dissolving. To determine the data, the mixtures are heated in a microscope at a heating rate of 10° C./min, and the microscopic appearance is observed. The melting points and glass transition temperatures are obtained from DSC investigations.

TABLE 3

| Composition | | | Melting point | Glass transition temperature | |
|---|---|---|---|---|---|
| [Wt. % A] | [Wt. % B] | [Wt. % 2] | [° C.] | [° C.] | Remarks |
| 77.5 | | 22.5 | 104 | 154 | |
| 68.0 | 10.2 | 21.8 | 44–87 | 155 | isotropic curing |
| 58.4 | 20.5 | 21.2 | 45–95 | 151 | isotropic curing |
| 49.6 | 29.8 | 20.6 | 42–90 | 149 | two-phase curing |
| 41.4 | 38.5 | 20.1 | 45–85 | 161 | two-phase curing |
| 33.9 | 46.6 | 19.5 | 44–90 | 165 | nematic curing |
| 18.8 | 62.7 | 18.5 | 42–88 | 162 | nematic curing |
| 6.1 | 76.3 | 17.6 | 75–100 | 157 | nematic curing |
| | 82.7 | 17.3 | 80–90 | 154 | nematic curing |

Notes:
"Isotropic curing" means that no liquid crystalline phase is observed under the selected conditions.
"Two-phase curing" means that an isotropic and a liquid crystalline phase occur side by side under the selected conditions.
"Nematic curing" means that only a liquid crystalline phase is formed.

Example 1

Chiral networks based on A, B, II with

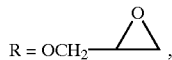

$R = OCH_2$—

1 and 2

Mixtures of A and B are employed for the experiments and are doped with chiral component II. The amine component (compound 1 or 2) is added in an amount such that the molar ratio of epoxide and amine groups is 2:1. The mixtures are also prepared by dissolving. To determine the data, the mixtures are heated in a microscope at a heating rate of 10° C./min, and the microscopic appearance is observed. The melting points and glass transition temperatures are obtained from DSC investigations.

TABLE 4

| Composition | | | | | | | |
|---|---|---|---|---|---|---|---|
| Wt. % A | Wt. % B | Wt. % II | Wt. % 1 | Wt. % 2 | Color | $T_{cure}$ [° C.] | $t_{cure}$ [min] |
| 54.41 | 18.96 | 3.84 | 22.79 | | | 110 | |
| 54.41 | 18.96 | 3.84 | 22.79 | | | 120 | |
| 55.59 | 19.37 | 3.92 | | 21.12 | | 110 | |
| 55.59 | 19.37 | 3.92 | | 21.12 | | 120 | |
| 55.59 | 19.37 | 3.92 | | 21.12 | | 150 | |
| 54.25 | 18.90 | 5.74 | | 21.11 | yellow | 150 | |
| | 75.52 | 4.96 | 34.14 | | yellow-orange | 95 | 40 |
| | 75.52 | 4.96 | 34.14 | | yellow | 100 | 60 |
| | 75.52 | 4.96 | 34.14 | | yellow-green | 110 | 60 |
| | 75.52 | 4.96 | 34.14 | | green-blue | 130 | 45 |

TABLE 4-continued

| Composition | | | | | | | |
|---|---|---|---|---|---|---|---|
| Wt. % A | Wt. % B | Wt. % II | Wt. % 1 | Wt. % 2 | Color | $T_{cure}$ [° C.] | $t_{cure}$ [min] |
| | 75.52 | 4.96 | 34.14 | | blue-green | 140 | 40 |
| | 75.52 | 4.96 | 34.14 | | blue | 150 | 20 |
| | 75.52 | 4.96 | 34.14 | | blue-violet | 160 | 20 |
| | 75.52 | 4.96 | 34.14 | | blue-violet | 180 | 15 |
| | 78.68 | 1.91 | 19.41 | | IR | 150 | 20 |
| | 78.03 | 2.53 | 19.44 | | IR | 150 | 20 |
| | 77.40 | 3.14 | 19.46 | | orange-red | 150 | 20 |
| | 75.56 | 4.90 | 19.54 | | blue | 150 | 20 |
| | 74.38 | 6.03 | 19.59 | | blue-violet | 150 | 20 |
| | 77.49 | 5.09 | | 17.42 | pale blue | 150 | 10 |
| | 77.49 | 5.09 | | 17.42 | yellow | 140 | 10 |
| | 77.49 | 5.09 | | 17.42 | yellow | 130 | 20 |

$T_{cure}$ = Curing temperature
$t_{cure}$ = Curing time

Example 2

Thermally Precured Mixtures

Components B, II with R=OCH$_2$

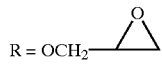

and 1 are mixed in the stated ratio by weight. The mixture is heated on a glass slide at 190° C. for 5 min, then covered with another glass slide and cured at $T_{cure}$. The results are compiled in Table 5.

TABLE 5

| Wt. % B | Wt. % II | Wt. % 1 | Color | $T_{cure}$ |
|---|---|---|---|---|
| 76.77 | 3.74 | 19.49 | orange | 110 |
| 76.77 | 3.74 | 19.49 | orange-green | 130 |
| 77.40 | 3.14 | 19.46 | red-orange | 110 |
| 77.40 | 3.14 | 19.46 | red-orange | 130 |
| 75.56 | 4.90 | 19.54 | blue-green | 100 |
| 75.56 | 4.90 | 19.54 | blue | 110 |
| 75.56 | 4.90 | 19.54 | blue | 130 |

Low-melting Mixtures of Components C, D and E

The mixtures are prepared from solutions as described in the general method.

The thermal data are acquired by DSC. All the mixtures form nematic liquid crystalline phases.

TABLE 6

| Compositions | | | Melting point [° C.] | Clearing point [° C.] |
|---|---|---|---|---|
| Mol % C | Mol % D | Mol % E | | |
| 10 | 90 | | 180 | 205 |
| | 10 | 0.9 | 155 | 172 |
| | 20 | 0.8 | 151 | 172 |

TABLE 6-continued

| Compositions | | | Melting point [° C.] | Clearing point [° C.] |
|---|---|---|---|---|
| Mol % C | Mol % D | Mol % E | | |
| 30 | | 0.7 | 149 | 175 |
| 35 | | 0.65 | 148 | 180 |
| 40 | | 0.6 | 154 | 180 |
| 50 | | 0.5 | 163 | 183 |
| 70 | | 0.3 | 172 | 197 |
| 90 | | 0.1 | 181 | 210 |

Example 3

Chirally Doped Mixtures Based on Compounds D, E and II with R=OCN—concentration effect The mixtures are prepared from solutions as described in the general method.

The thermal data are acquired by DSC. All the mixtures form a cholesteric liquid crystalline phase.

TABLE 7

| Composition | | | | Color | $T_{cure}$ [° C.] | $t_{cure}$ [min] |
|---|---|---|---|---|---|---|
| Wt. % D | Wt. % E | Wt. % II | Wt. % II | | | |
| 0.975 | | | 0.025 | IR | 160 | 30 |
| 0.97 | | | 0.03 | pale orange | 160 | 30 |
| 0.96 | | | 0.04 | orange-red | 160 | 30 |
| 0.95 | | | 0.05 | blue-green | 160 | 30 |
| 0.94 | | | 0.06 | blue-violet | 160 | 30 |
| 0.93 | | | 0.07 | violet | 160 | 30 |
| 0.925 | | | 0.075 | pale violet | 160 | 30 |
| 0.9 | | | 0.1 | UV | 160 | 30 |
| 0.95 | | 0.05 (R = OH) | | blue-green | 160 | 30 |
| | 0.96 | | 0.04 | IR | 160 | 30 |
| | 0.94 | | 0.06 | pale orange | 160 | 30 |
| | 0.92 | | 0.08 | orange-green | 160 | 30 |
| | 0.90 | | 0.10 | green-blue | 160 | 30 |
| | 0.88 | | 0.12 | blue-violet | 160 | 30 |

We claim:

1. A sheet-like structure prepared by thermal curing of a mixture of nematic liquid crystalline compounds or compounds undergoing transitions to nematic liquid crystalline compounds and of a chiral component, the nematic and chiral components of the mixture each having one or more thermally polymerizable groups, and the sheet-like structure having a crosslinked cholesteric liquid crystalline ordered structure.

2. The sheet-like structure as claimed in claim 1, wherein the nematic compounds have two thermally polymerizable groups.

3. The sheet-like structure as claimed in claim 1, wherein the ratio of mixed nematic compounds to chiral component is adjusted depending upon the color of emitted light required from the sheet-like structure.

* * * * *